United States Patent
Foster et al.

(10) Patent No.: US 6,817,095 B2
(45) Date of Patent: Nov. 16, 2004

(54) METHOD FOR ASSEMBLING A VANE-TYPE CAM PHASER

(75) Inventors: Emily E. Foster, Pierson, MI (US); William P. Vukovich, Wyoming, MI (US); Donald T. Truszkowski, Grand Rapids, MI (US); Mark D. Lemieux, Conklin, MI (US); Joel B. Lemieux, Coopersville, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/367,474

(22) Filed: Feb. 14, 2003

(65) Prior Publication Data

US 2003/0226256 A1 Dec. 11, 2003

Related U.S. Application Data

(60) Provisional application No. 60/387,861, filed on Jun. 11, 2002.

(51) Int. Cl.[7] .............................. B23P 15/00; B21K 3/00
(52) U.S. Cl. ...................... 29/888.01; 29/407.1; 29/428
(58) Field of Search .............................. 29/888.01, 428, 29/407.1; 123/90.17; 74/568 R; 464/160

(56) References Cited

U.S. PATENT DOCUMENTS

| | | |
|---|---|---|
| 6,176,210 B1 | 1/2001 | Lichti et al. |
| 6,276,321 B1 | 8/2001 | Lichti et al. |
| 6,412,462 B1 | 7/2002 | Lichti et al. |
| 6,637,390 B1 | 10/2003 | Dauer et al. |
| 2003/0217717 A1 * | 11/2003 | Pierik et al. ............. 123/90.17 |
| 2003/0217718 A1 * | 11/2003 | Pierik et al. ............. 123/90.17 |
| 2003/0217720 A1 * | 11/2003 | Pierik et al. ............. 123/90.17 |

* cited by examiner

Primary Examiner—Irene Cuda Rosenbaum
(74) Attorney, Agent, or Firm—Patrick M. Griffin

(57) ABSTRACT

A partial assembly process for a vane-type cam phaser. A pulley/sprocket is loaded onto a first camshaft-shaped fixture with a cam nose extending beyond the length of an actual cam nose such that a phaser rotor containing a locking bolt, when mounted onto the cam nose, is displaced axially from the pulley/sprocket by an amount sufficient to set the axial engagement of the bolt upon final assembly. A stator is loaded onto the pulley/sprocket and is rotated clockwise until it contacts the rotor, thereby removing all rotational and radial lash from the system. One or more axial holes are bored through the pulley/sprocket and stator and a locking pin such as a roll pin is inserted to permanently pin the stator to the pulley/sprocket. Finally, the partially-assembled phaser is removed from the cam-like fixture, the rotor is fully seated against the pulley/sprocket, the locking bolt is withdrawn from the pulley/sprocket, the rotor is rotated to an intermediate position, and the phaser cover is added to the assembly.

7 Claims, 3 Drawing Sheets

METHOD FOR ASSEMBLING A VANE-TYPE CAM PHASER

RELATIONSHIP TO OTHER APPLICATIONS

The present application claims priority from U.S. Provisional Patent Application, Ser. No. 60/387,861, filed Jun. 11, 2002.

TECHNICAL FIELD

The present invention relates to vane-type camshaft phasers for varying the phase relationship between crankshafts and camshafts in internal combustion engines; more particularly, to such phasers wherein a locking bolt is utilized to lock the phaser rotor with respect to the stator at certain times in the operating cycle; and most particularly, to an improved method for assembling such a camshaft phaser.

BACKGROUND OF THE INVENTION

Camshaft phasers for varying the phase relationship between the crankshaft and a camshaft of an internal combustion engine are well known. In vane-type cam phasers, a variable locking bolt is typically included to permit rotational locking of the rotor to the stator under certain conditions of operation of the phaser and engine.

In a prior art assembly method, a locating pin is utilized to rotationally orient and fix the stator to a pulley or sprocket which drives the phaser in the engine. The pin not only sets the stator position during assembly but also holds the stator position during operation, as otherwise contact with the rotor can cause rotational movement of the stator with respect to the pulley, thus causing mis-timing of the engine. The rotational relationship of the stator to the pulley further controls the ability of the locking bolt mechanism, located in the rotor, to engage the pulley during service and to do so without excessive lock-bolt lash.

The prior art assembly method relies on several precision machined dimensions of the rotor, stator, pulley/sprocket, lock bolt, lock bolt bushing, and insert, which dimensions stack up to obtain a lock bolt engagement depth which allows the phaser to function through disengagement and re-engagement of the tapered lock bolt. These dimensions include the positions of the locator holes in the stator and pulley/sprocket for the locking pin(s). These precision dimensions can cause excessive cost in the manufacturing processes, in both in-house fabrication cost and direct material cost. Assembly of the phaser is also complicated such that dimensions in the lock bolt stack-up typically must be checked during every assembly to assure lock bolt function in the assembled phaser. Furthermore, the actual lock bolt engagement cannot be checked readily on a fully-assembled phaser and therefore must be checked during the assembly process, which causes variation in the assembly procedure and forces even tighter control of the process.

The problem exists in vane-type cam phasers employing either a straight-sided bolt or a tapered bolt. Since both axial and rotational lash can occur in the system, and since some lash is needed to assure that the bolt can both engage and disengage with the pulley/sprocket, what is needed is a simple method for setting the depth of engagement of the bolt and final rotational lash of the assembly prior to pinning the stator to the pulley/sprocket.

It is a principal object of the present invention to provide an improved method for assembling a vane-type cam phaser.

It is a further object of the invention to reduce the cost of manufacturing a vane-type cam phaser.

It is a still further object of the invention to improve the reliability of a vane-type cam phaser.

SUMMARY OF THE INVENTION

Briefly described, in an assembly process for a vane-type cam phaser, the pulley/sprocket is loaded onto a camshaft-shaped fixture with a camshaft nose. The camshaft nose feature is extended beyond the length of an actual camshaft nose such that a phaser rotor containing a locking bolt, when mounted onto the camshaft nose, is displaced axially by an amount sufficient to set the axial engagement of the bolt upon final assembly. The stator is loaded onto the pulley/sprocket and is rotated clockwise until it contacts the rotor, thereby removing all rotational and radial lash from the system. Then one or more axial holes are bored through the pulley/sprocket and stator and a locking pin such as a roll pin is inserted to permanently pin the stator to the pulley/sprocket. Finally, the partially-assembled phaser is removed from the cam-like fixture, the rotor is fully seated against the pulley/sprocket, the locking bolt is withdrawn from the pulley/sprocket, the rotor is rotated to an intermediate position, and the phaser cover is added to the assembly.

BRIEF DESCRIPTION OF THE DRAWINGS

These and other features and advantages of the invention will be more fully understood and appreciated from the following description of certain exemplary embodiments of the invention taken together with the accompanying drawings, in which.

DESCRIPTION OF THE PREFERRED EMBODIMENTS

Figure 1:
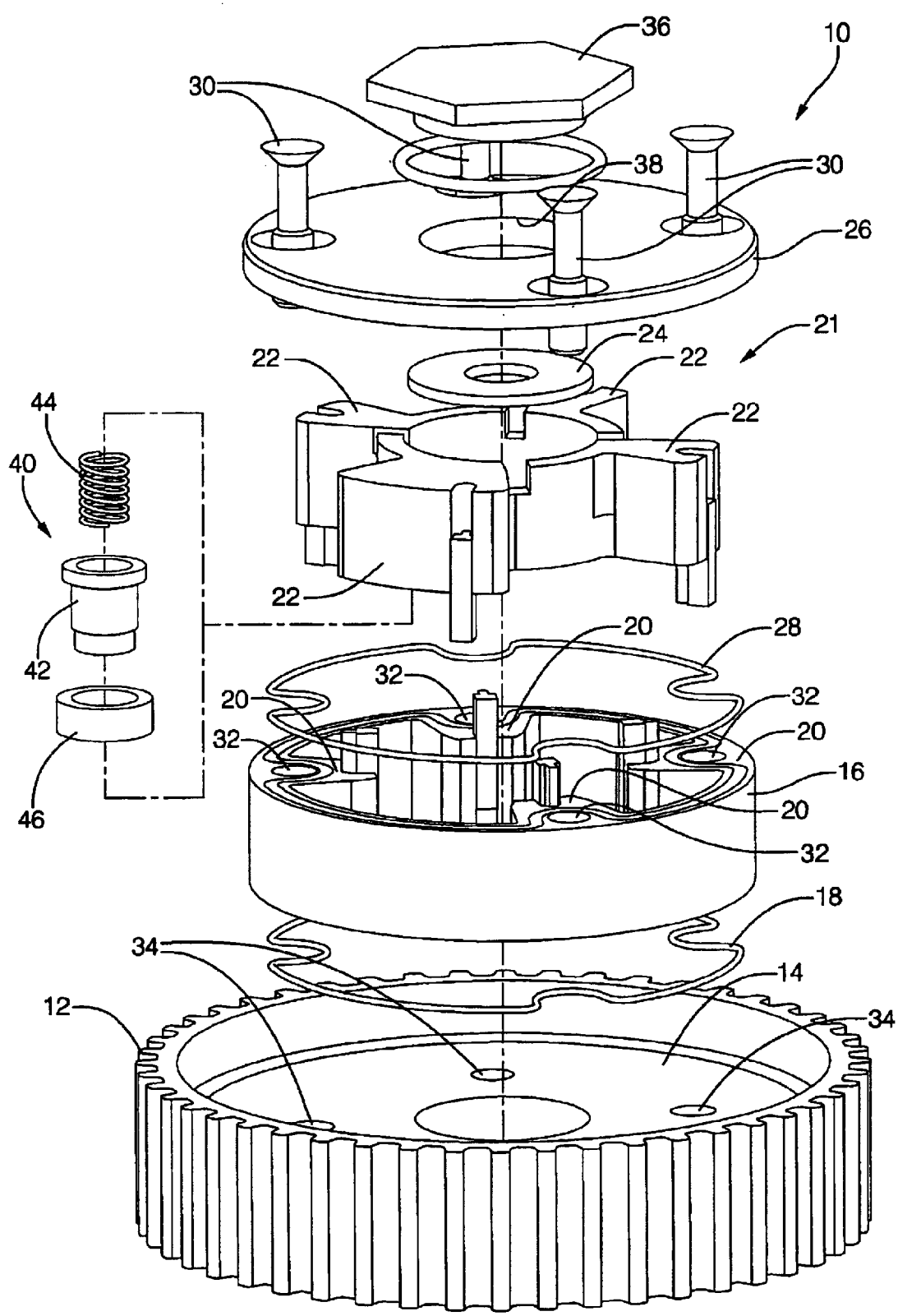
FIG. 1 is an exploded isometric view of a typical prior art vane-type camshaft phaser.

Referring to FIG. 1, a typical prior art vane type cam phaser 10 includes a pulley or sprocket 12 for engaging a timing chain or belt (not shown) operated by an engine crankshaft (not shown). The upper surface 14 of pulley/sprocket 12 forms a first wall of hydraulic chambers in the assembled phaser. A stator 16 is disposed against surface 14 and is sealed thereto by a first seal ring 18. As discussed below, stator 16 is rotationally immobilized with respect to pulley/sprocket 12. Stator 16 is provided with a plurality of inwardly-extending lobes 20 circumferentially spaced apart for receiving a rotor 21 including outwardly extending vanes 22 which extend into the spaces between lobes 20. Hydraulic advance and retard chambers are thus formed between lobes 20 and vanes 22. A thrust washer 24 is concentrically disposed against rotor 21, and cover plate 26 seals against stator 16 via a second seal ring 28. Bolts 30 extend through bores 32 in stator 16 and are received in threaded bores 34 in pulley/sprocket 12. In installation to an engine camshaft, phaser 10 is secured via a central bolt (not shown) through thrust washer 24 which is covered by cover plug 36 which is threaded into bore 38 in cover plate 26.

A locking bolt mechanism 40 comprises a hollow bolt 42, return spring 44, and wear sleeve 46. Bolt 42 and spring 44 are received in a longitudinal bore 48 (FIG. 2) in a vane 22 of rotor 21, the bolt 42 being extendable by spring 44 from the underside of the vane. Wear sleeve 46 is press-fit into a bore (FIG. 2) in pulley/sprocket 12 for receiving bolt 42 when extended from bore 48 to rotationally lock rotor 22 to pulley/sprocket 12 and, hence, stator 16.

It is important that bolt 42 extend from bore 48 by a predetermined length. In the prior art, this requires that the manufacturing tolerances of rotor thickness, bore placement, and bolt length be highly controlled.

It is also important that the stator be attached to the pulley/sprocket at precisely the correct angular relationship to the rotor for proper function of the assembled phaser and to minimize operational noise from mechanical lash among the moving components. In the prior art, this requires that, in addition to the tolerances just noted, the manufacturing tolerances of the stator and pulley/sprocket also be highly controlled, and specifically, the locations of a longitudinal bore in the pulley/sprocket and a mating bore in the stator for receiving a locking pin.

Figure 2:
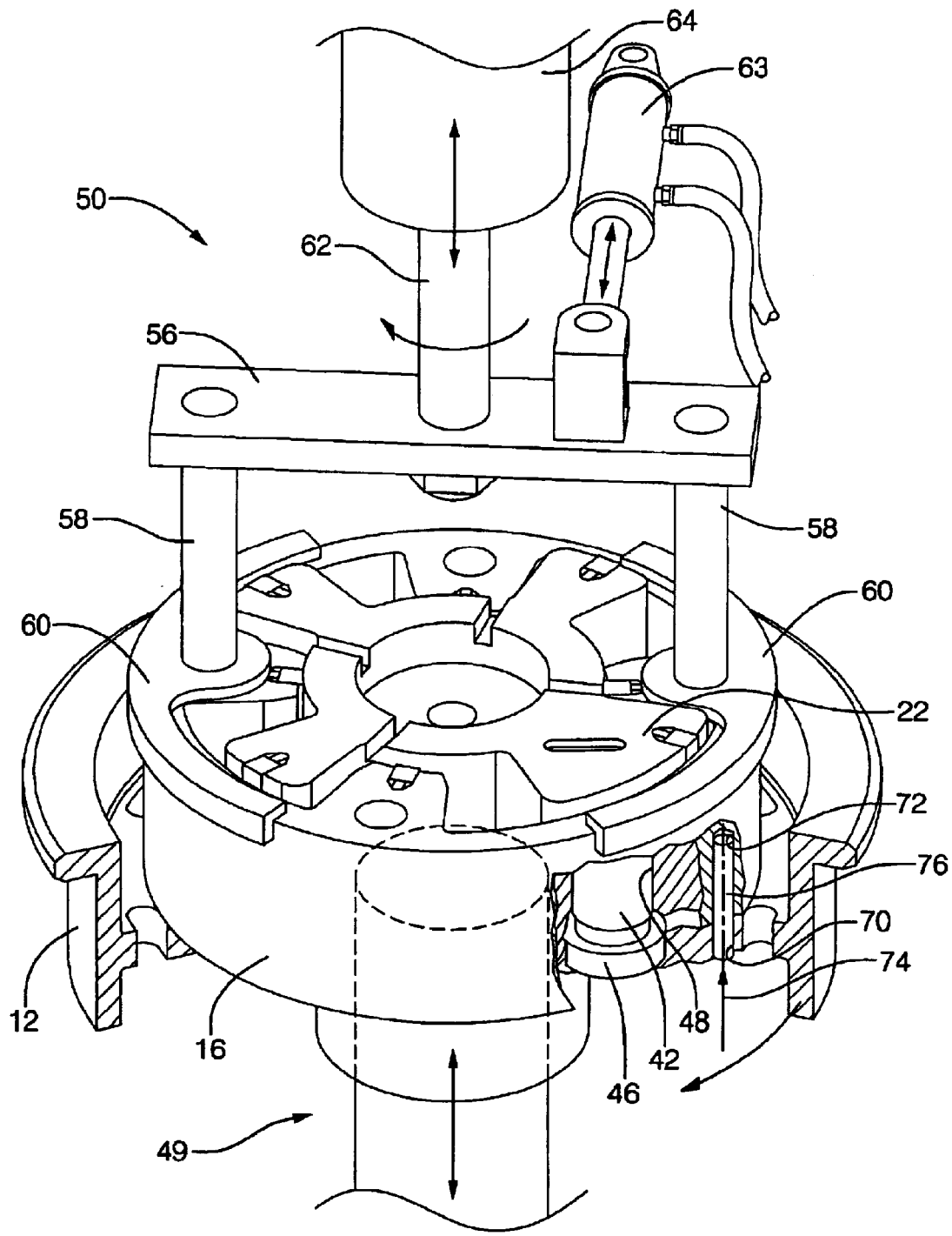
FIG. 2 is an isometric view of a partially assembled cam phaser mounted in fixturing in accordance with the invention.
Figure 3:
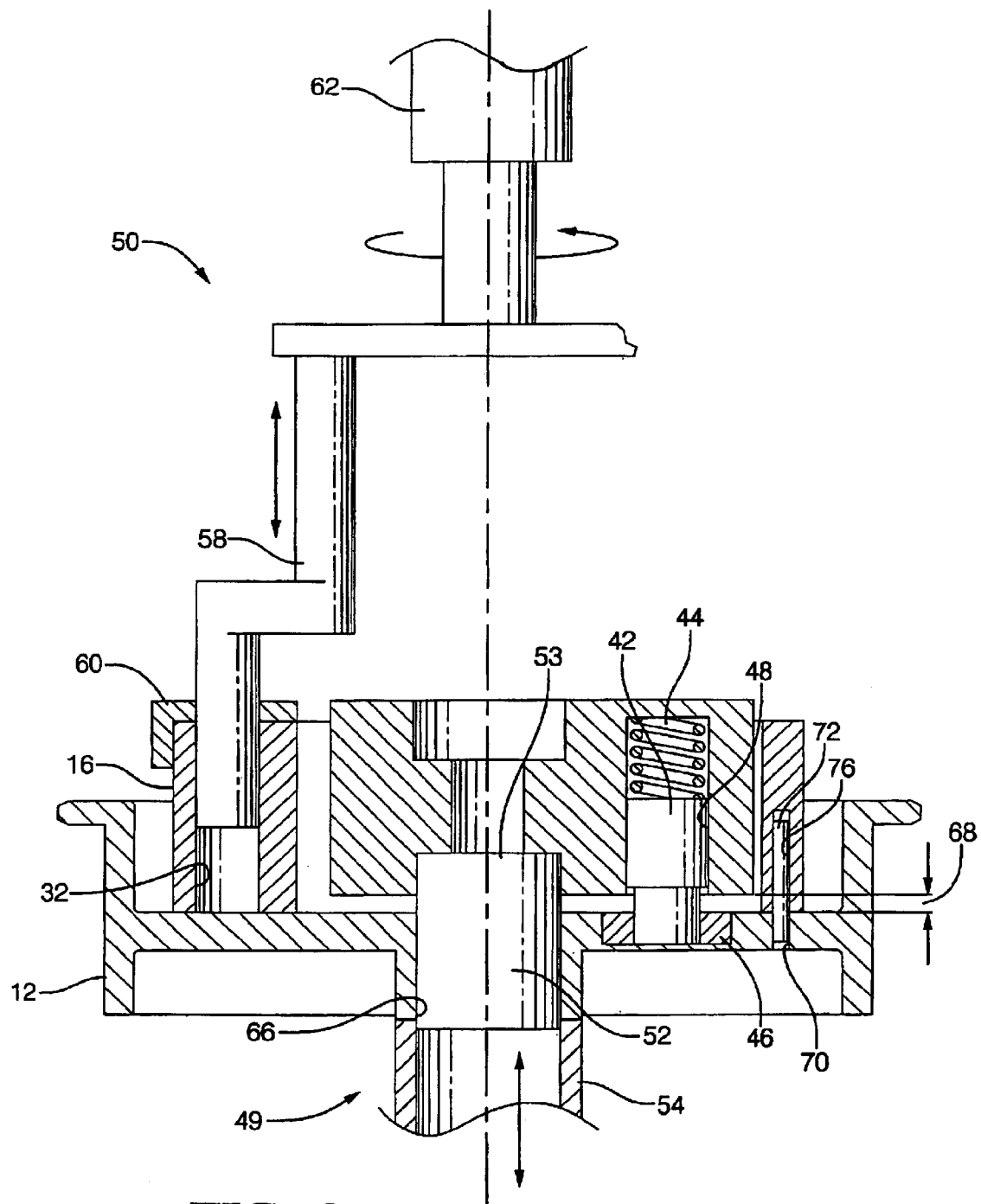
FIG. 3 is a cross-sectional view, partially schematic, of the partially assembled cam phaser and fixturing shown in FIG. 2.

Referring to FIGS. 2 and 3, an assembly method and apparatus is shown which significantly eases the stack-up requirements of manufacturing tolerances, removes unwanted mechanical lash in the assembly, and provides a predetermined engagement depth of the bolt into the sleeve. Further, during mounting of a phaser to a camshaft when the lock bolt is engaged into the sleeve in locking position, torque applied to the mounting bolt can cause the lock bolt to be angularly jammed against the sleeve. By eliminating lash in the system and providing for non-engagement by the lock bolt after assembly, the improved assembly method of the invention assures that the locking mechanism will function quietly and properly after full assembly of the phaser.

Fixturing for phaser assembly in accordance with the invention includes a lower fixture assembly 49 and an upper fixture assembly 50.

Lower assembly 49 includes a mandrel 52, simulating the nose 53 of a camshaft to which phaser 10 will be mounted for use, and preferably an outer flange 54. In a currently preferred embodiment, mandrel 52 may be advanced and withdrawn axially of flange 54.

Upper assembly 50 includes a bridge 56 having at least one leg 58 for extending into at least one bore 32 in stator 16. Legs 58 preferably also comprise flanges 60 for engaging and urging stator 16 against pulley/sprocket 12 during assembly. Bridge 56 is connected to an axial shaft 62 which may be controllably rotated by conventional rotation means 63 and which may be axially advanced and withdrawn controllably by axial piston or other means 64.

In a method for partially assembling a phaser in accordance with the invention, a pulley/sprocket 12 fitted with sleeve 46 is loaded onto lower fixturing 49, resting on flange 54 with mandrel 52 protruding through central opening 66 in pulley/sprocket 12. Sleeve 46 is located with respect to threaded bores 34 such that bolts 30 may extend through bores 32 and be received in bores 34 after the lash-removal steps described below. First seal ring 18, stator 16, and rotor 21 containing bolt 42 and spring 44 are stacked concentrically and in order onto pulley/sprocket 12 and are rotationally oriented such that locking bolt 42 extends into sleeve 46. Mandrel 52 is axially advanced by a predetermined amount 68 which corresponds to the engagement depth of the bolt into the sleeve after assembly.

Upper fixturing 50 is lowered to engage legs 58 into bores 32 and to engage flanges 60 with the upper surface of stator 16. Bridge 56 then is rotated clockwise by rotation means 63, thereby rotating stator 16 such that vanes 22 of rotor 21 make contact with lobes 20 of stator 16 and locking bolt 42 makes contact with sleeve 46, thus removing all angular and radial mechanical lash from the assembly. This is the rotational relationship which will pertain in the assembled phaser during operation when the rotor is locked to the pulley/sprocket.

Stator 16 is now urged firmly against pulley/sprocket 12 by piston 64 and flanges 60, and holes 70, 72 are bored 74 longitudinally through pulley/sprocket 12 and stator 16, respectively, and pin 76 is inserted into holes 70, 72 to attach stator 16 to pulley/sprocket 12. Such drilling and insertion may be performed beginning with either the stator or the pulley/sprocket, the latter being currently preferred. In a currently preferred embodiment, hole 70 is pre-drilled before assembly; further and preferably, additional bores and pins are similarly installed at one or more other peripheral locations around stator 16 and pulley/sprocket 12. Preferably, the pin(s) are staked after insertion or otherwise prevented in known fashion from working out of the bores during use of the phaser.

Rotor 21 then is lifted sufficiently to disengage bolt 42 from sleeve 46 and is rotated clockwise to another position in which bolt 42 cannot engage sleeve 46. Mandrel 52 is withdrawn, and rotor 21 is fully seated against surface 14. Upper fixturing 50 is withdrawn. Second seal ring asher 24, and cover plate 26 including plug 36 are installed onto stator 16 and secured by bolts 30 as described above to complete the assembly.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A method for partially assembling a vane-type camshaft phaser, comprising the steps of:
   a) disposing a stator concentrically onto a surface of a pulley/sprocket, said stator having a plurality of inwardly-extending lobes and said pulley/sprocket having a locking bore for receiving a locking bolt;
   b) disposing a rotor having a plurality of radial vanes within said stator at a predetermined axial distance away from said pulley/sprocket, said rotor having said locking bolt extending therefrom;
   c) rotating said rotor until said locking bolt is engaged into a stator bore;
   d) rotating said stator on said pulley-sprocket until at least one of said rotor vanes makes contact with at least one of said stator lobes;
   e) rotating said stator and rotor together further until said locking bolt makes contact with a side of said locking bore in said pulley/sprocket;
   f) attaching said stator to said pulley/sprocket to rotationally immobilize said stator with respect to said pulley/sprocket;
   g) rotating said rotor to another position wherein said locking bolt is disengaged from said locking bore; and
   h) displacing said rotor axially by said predetermined distance into contact with said pulley/sprocket.

2. A method in accordance with claim 1 further comprising the step of inserting a first seal ring between said stator and said pulley/sprocket.

3. A method in accordance with claim 1 further comprising the step of inserting a wear sleeve in said locking bore in said pulley/sprocket.

4. A method in accordance with claim 1 wherein said attaching step further comprises the steps of boring first and second mating holes in said pulley/sprocket and said stator, respectively, and inserting a locking pin into said holes.

5. A method in accordance with claim 1 wherein said attaching step further comprises the steps of boring a plurality of first and second mating holes in said pulley/sprocket and said stator, respectively, and inserting at least one locking pin into said holes.

6. A method in accordance with claim 1 further comprising the step of urging said stator against said pulley/sprocket prior to said attaching step.

7. A method for partially assembling a vane-type camshaft phaser, comprising the steps of:
- a) providing first fixturing means including means for supporting a pulley/sprocket and means for supporting a rotor at an axial distance from said pulley/sprocket;
- b) providing second fixturing means including means for controllably rotating a stator with respect to said pulley/sprocket;
- c) mounting a pully/sprocket on said first fixturing means, said pulley/sprocket having a bore for receiving a locking bolt;
- d) disposing a stator concentrically onto said pulley/sprocket, said stator having a plurality of inwardly-extending lobes;
- e) disposing a rotor having a plurality of radial vanes within said stator on said rotor supporting means at said axial distance from said pulley/sprocket, said rotor having a said locking bolt extending therefrom;
- f) rotating said rotor until said locking bolt is engaged into a stator bore;
- g) rotating said stator on said pulley-sprocket until at least one of said rotor vanes makes contact with at least one of said stator lobes;
- h) rotating said stator and rotor further until said locking bolt makes contact with a side of said bore in said pulley/sprocket;
- i) attaching said stator to said pulley/sprocket to rotationally immobilize said stator with respect to said pulley/sprocket;
- j) rotating said rotor to another position wherein said locking bolt is disengaged from said locking bore; and
- k) displacing said rotor axially into contact with said pulley/sprocket.

\* \* \* \* \*